(12) United States Patent
Maestro Garcia et al.

(10) Patent No.: US 10,868,919 B2
(45) Date of Patent: Dec. 15, 2020

(54) PRINTER CALIBRATION ADJUSTING NPAC VECTOR BASED ON MEASUREMENT DATA

(71) Applicant: Hewlett-Packard Development Company, L.P., Spring, TX (US)

(72) Inventors: Javier Maestro Garcia, Sant Cugat del Valles (ES); Jordi Arnabat Benedicto, Sant Cugat del Valles (ES); Peter Morovic, Sant Cugat del Valles (ES); Jan Morovic, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/632,440

(22) PCT Filed: Sep. 18, 2017

(86) PCT No.: PCT/US2017/052029
§ 371 (c)(1),
(2) Date: Jan. 20, 2020

(87) PCT Pub. No.: WO2019/055045
PCT Pub. Date: Mar. 21, 2019

(65) Prior Publication Data
US 2020/0210790 A1    Jul. 2, 2020

(51) Int. Cl.
*G06K 15/02*    (2006.01)
*H04N 1/00*    (2006.01)
(Continued)

(52) U.S. Cl.
CPC ....... *H04N 1/00015* (2013.01); *G06K 15/027* (2013.01); *G06K 15/1878* (2013.01);
(Continued)

(58) Field of Classification Search
None
See application file for complete search history.

(56) References Cited

U.S. PATENT DOCUMENTS 6,081,344 A    6/2000    Bockman et al.
8,870,319 B2   10/2014   Maltz et al.
(Continued)

FOREIGN PATENT DOCUMENTS

EP    3213501    12/2019

OTHER PUBLICATIONS

Slavuj, Radovan et al. "Estimating Neugebauer primaries for multi-channel spectral printing modeling." In Measuring, Modeling, and Reproducing Material Appearance, vol. 9018, p. 9018OC. International Society for Optics and Photonics, 2014.

*Primary Examiner* — Scott A Rogers
(74) *Attorney, Agent, or Firm* — HP Inc. Patent Department

(57) ABSTRACT

Certain examples described herein relate to printer calibration. In certain cases, measurement data is received, the measurement data indicative of an adjustment to be applied to a given colorant in a set of colorants printable by a printing system. In certain examples, a Neugebauer primary area coverage (NPac) vector comprising an area coverage of a first Neugebauer primary (NP) is obtained. Based on the received measurement data, the NPac vector is adjusted by decreasing the area coverage in the NPac vector of the first NP and increasing an area coverage in the NPac vector of a second NP. The first NP and the second NP correspond to colorant combinations that differ by a predetermined amount of the given colorant.

15 Claims, 5 Drawing Sheets

(51) Int. Cl.
*H04N 1/60* (2006.01)
*H04N 1/52* (2006.01)

(52) U.S. Cl.
CPC ..... *G06K 15/1881* (2013.01); *H04N 1/00023* (2013.01); *H04N 1/00034* (2013.01); *H04N 1/00087* (2013.01); *H04N 1/52* (2013.01); *H04N 1/6008* (2013.01); *H04N 1/6033* (2013.01); *H04N 1/6038* (2013.01); *G06K 2215/0094* (2013.01); *H04N 2201/0005* (2013.01)

(56) References Cited

U.S. PATENT DOCUMENTS

| | | |
|---|---|---|
| 8,873,104 B2 | 10/2014 | Nachlieli et al. |
| 9,591,187 B2 | 3/2017 | Martinez de Salinas Vazquez et al. |
| 2014/0132778 A1 | 5/2014 | Holub |
| 2016/0086059 A1 | 3/2016 | Morovic et al. |
| 2016/0155032 A1 | 6/2016 | Morovic et al. |
| 2019/0238723 A1* | 8/2019 | Morovic ................. H04N 1/60 |

\* cited by examiner

PRINTER CALIBRATION ADJUSTING NPAC VECTOR BASED ON MEASUREMENT DATA

BACKGROUND

A printing system may include a plurality of different color printing fluids or colorants. By overprinting images for each of the printing fluids or colorants, an image with a range of different colors can be printed. An example printing pipeline may be calibrated so that printed colors are similar to or match desired colors, such as those defined in a digital format.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
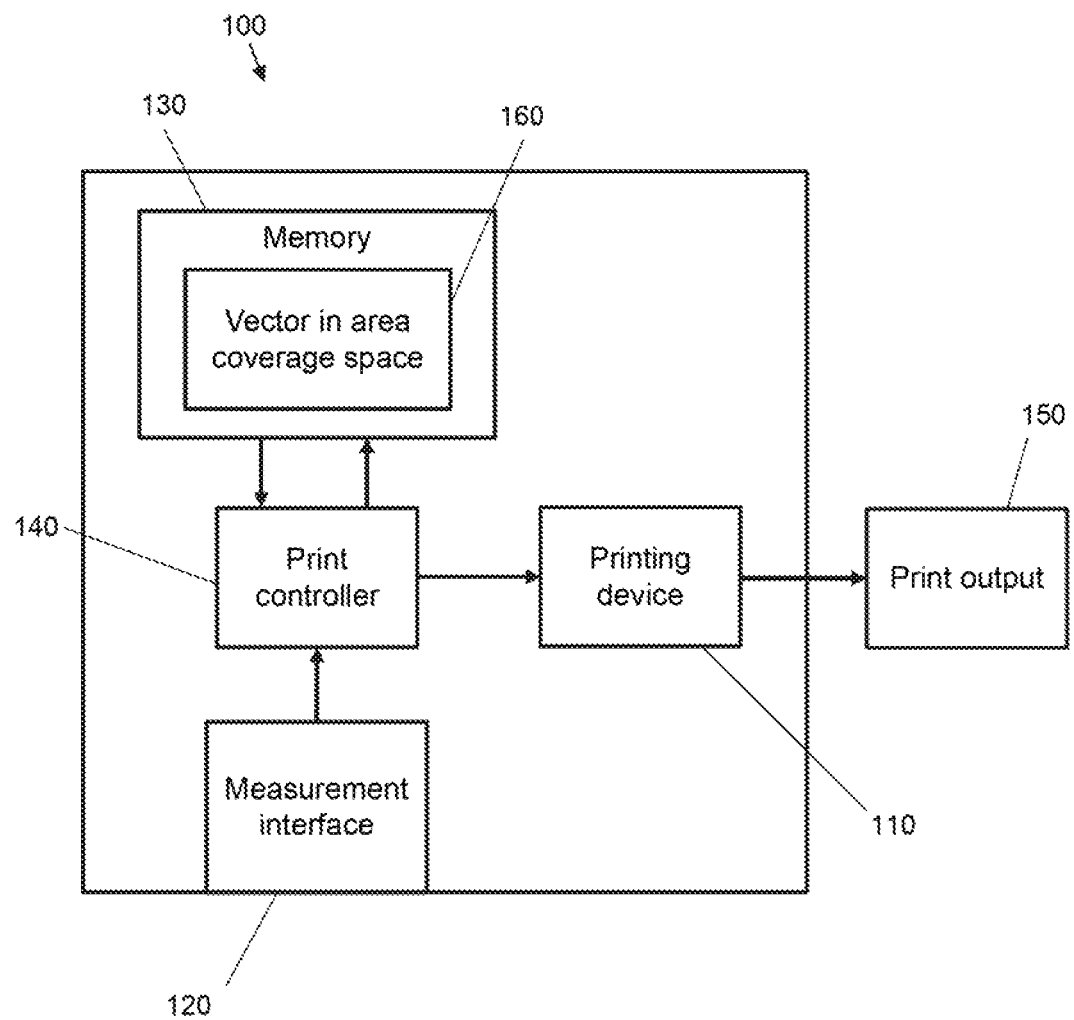
FIG. 1 is a schematic diagram of a printing system according to an example.

Certain examples described herein relate to color calibration of a printing system. Color calibration of a printing system may, for example, be used to adjust the color response of the printing system to more accurately correspond to a desired color to be printed. Color calibration may be used to calibrate a color mapping process by which a first representation of a given color is mapped to a second representation of the same color. Color can be represented within print and display devices in a large variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables ('X', 'Y' and 'Z' or tristimulus values) are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Other color spaces include area coverage spaces, such as the Neugebauer Primary area coverage (NPac) color space. An NPac vector in the NPac color space represents a statistical distribution of one or more Neugebauer Primaries (NPs) over an area of a halftone. In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). A colorant or printing fluid combination as described herein may be formed of one or multiple colorants or printing fluids. For example, if a bi-level printing device uses CMY printing fluids there can be eight NPs. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printer) in a common addressable print area (e.g. a printable "pixel"). An NP may be referred to as a "pixel state".

In multi-level printers, e.g. where print heads are able to deposit N drop levels, an NP may include one of $N^k-1$ combinations of k printing fluids, or an absence of printing fluid (resulting in $N^k$ NPs in total). For example, if a multi-level printer uses CMY printing fluids with four different drop states ("no drop", "one drop", "two drops" or "three drops"), available NPs can include C, CM, CMM, CMMM, etc.

Each NPac vector may therefore define the probability distribution for one or more colorant or printing fluid combinations for each pixel in the halftone (e.g. a likelihood that a particular colorant or printing fluid combination is to be placed at each pixel location in the halftone). In this manner, a given NPac vector defines a set of halftone parameters that can be used in the halftoning process to map a color to one or more NPac vectors to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. An example of a printing system that uses area coverage representations for halftone generation is a Halftone Area Neugebauer Separation (HANS) pipeline.

Color calibration of a printing system may be performed on independent colorant channels separately, that is, by performing one-dimensional correction on a colorant-by-colorant basis. While this method may produce an accurate calibration of the colorant channels themselves, it may not take color interaction into account. For example, colors for which colorants or printing fluids are overprinted or combined may not be calibrated accurately. Calibration of colorant combinations may be uncontrolled when correction is performed on a colorant-by-colorant basis. Furthermore, some printing systems may be configured not to have independent colorant channels. In a HANS printing system, for example, area coverages in an NPac vector may sum to 1, since the area coverages represent probabilities. There is therefore a dependency between different colorant combinations, where if the area coverage of one colorant combination is increased, the area coverage of other colorant combinations contributing to the NPac vector is decreased.

As an alternative to performing calibration on a colorant-by-colorant basis, color calibration may be performed on an NP-by-NP basis, where each NP corresponds to a colorant combination. Each NP in a set of available NPs may be printed, color measured and individually adjusted. However, printing systems may use a relatively large number of NPs. For example, there may be 128 available NPs. In some examples, there are more than 128 available NPs. Printing and color measuring each NP may be inefficient and/or impractical in terms of print target wastage, e.g. media wastage, and/or calibration time, especially since multiple patches may be printed and color measured for each NP to obtain a correction factor for that NP. Further, applying corrections to different NPs independently may not be applicable in some systems.

One method of performing calibration in a HANS printing system involves reducing an amount of colorant in an NPac vector to a target level, e.g. based on measured calibration data, and increasing an amount of whitespace in the NPac vector to compensate for the reduced amount of colorant. However, this method can increase grain and thus affect the visual quality of the print output.

FIG. 1 shows a printing system 100 according to an example. Certain examples described herein may be implemented within the context of this printing system.

The printing system 100 may be a 2D printing system such as an inkjet or digital offset printer, or a 3D printing system, otherwise known as an additive manufacturing system. In the example of FIG. 1, the printing system 100 comprises a printing device 110, a measurement interface 120, a memory 130, and a print controller 140. The print controller 140 may be implemented using machine readable instructions and/or suitably programmed or configured hardware.

The printing device 110 is arranged to print a calibration area onto a print substrate to produce a print output 150. The print output 150 may, for example, comprise colored printing fluids deposited on a substrate. The printing device 110 may comprise an inkjet deposit mechanism. In 2D printing systems, the substrate may be paper, fabric, plastic or any other suitable print medium.

In 3D printing systems, the print output 150 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. In some examples, colorants may be deposited on a white or blank powder to color the powder. In other examples, objects may be constructed from layers of fused colored powder. In these cases, calibration areas may comprise areas formed from or within one or more layers of fused material.

The printed calibration area may be otherwise referred to as a "test patch" or "test area". The printed calibration area may be used to calibrate the printing system 100. The printed calibration area corresponds to a given colorant in a set of colorants printable by the printing system 100. A colorant may be otherwise referred to as a "printing fluid". A colorant may correspond to a given base color, where other colors may be formed from combinations of colorants. Examples of base colors include, but are not limited to, cyan, magenta, yellow, red, green and blue and black. In some examples, a plurality of calibration areas are printed, each corresponding to a different colorant in the set of colorants. In one example, the set of colorants comprises 4 colorants. In another example, the set of colorants comprises 7 colorants. In another example, the set of colorants comprises 15 colorants. The number of colorants in the set of colorants is less than the number of possible colorant combinations, e.g. NPs. A plurality of patches may be printed for a given colorant. In some examples, 16 patches are printed for a given colorant in the set of colorants. Different patches may correspond to different amounts of the given colorant.

The measurement interface 120 is arranged to receive an indication of a measured optical property of the printed calibration area. In an example, the measurement interface 120 comprises a physical connection. The physical connection may be, for example, a Universal Serial Bus (USB) and/or serial data connection to electrically couple a measurement device such as a spectrophotometer and/or colorimeter, wherein data values are transmitted using an appropriate communication protocol over the interface. The measurement interface 120 may comprise a wired or wireless interface. In an example, the measurement interface 120 comprises a user interface. The user interface may, for example, comprise graphical components such as form fields to receive measurement data, e.g. data output by a separate measurement device. In some examples, the measurement interface 120 is to receive input from an optical measurement device. The optical measurement device may comprise a color measurement device. Examples of optical measurement devices include, but are not limited to, photodiodes, spectrophotometers, spectrofluorometers, spectrocolorimeters, tristimulus colorimeters and lightness sensors. In an example, the optical measurement device is comprised in the printing system 100. In another example, the optical measurement device is separate from the printing system 100. The optical measurement device may be communicatively coupled to the printing system 100, for example via the measurement interface 120.

The measurement interface 120 may transmit information regarding the indication of measured optical property to the print controller 140. The print controller 140 may store information regarding the measured optical property in the memory 130. In some examples, the print controller 140 may, as described below, modify an NPac vector based on the indication of measured optical property. The measured optical property may be used to derive an adjustment to be applied to the given colorant. The adjustment may correspond to a target reduction or target increase of an amount of the given colorant in the print output. An example of an adjustment is a correction. The adjustment may comprise a factor to be multiplied to printed colorant quantities such that a target colorant state is attained. In an example, the adjustment is comprised in the received measurement data. In another example, the adjustment is derived by the print controller 140 on the basis of the received measurement data.

The memory 130 comprises a vector 160 in an area coverage space. In an example, the vector 160 comprises an NPac vector. The vector 160 defines a statistical distribution of colorant combinations including a first colorant combination over an area of a halftone.

In some examples, the memory 130 comprises a lookup table mapping colorimetric values with vectors in the area coverage space. For example, the lookup table may map RGB or CMYK color values to NPac vectors. In some examples, the lookup table maps XYZ, LAB or any other color space used to specify the device color space. Where the vectors comprise NPac vectors, the lookup table may be referred to as a "HANS lookup table". When an RGB mapping is used, the HANS lookup table may comprise $17^3$ entries. When a CMYK mapping is used, the HANS lookup table may comprise $9^4$ entries. The vector 160 may correspond to an entry in the HANS lookup table.

The print controller 140 is arranged to modify the vector 160 on the basis of the measured optical property. The print controller 140 is arranged to modify the vector 160 by decreasing a contribution to the vector 160 of the first colorant combination and increasing a contribution to the vector 160 of a second colorant combination. The second colorant combination differs from the first colorant combination by a predetermined amount of the given colorant.

In some examples, the memory 130 comprises a matrix of colorant combinations. The matrix may comprise as many rows as there are available colorant combinations, e.g. NPs. In some examples, each column of the matrix corresponds to a different colorant or printing fluid useable by the printing system 100. The matrix includes the first colorant combination and the second colorant combination. The matrix may be populated according to a predetermined format such that the second colorant combination may be identified on the basis of the position in the matrix of the first colorant combination. As such, the matrix describes relationships between colorant combinations in terms of the different contributions of colorants to those colorant combinations. The elements in the matrix store the colorant combination that would result if a predetermined amount of a given colorant is subtracted from a given colorant combination. An example of a predetermined amount is one drop. The table below illustrates an example section of such a matrix.

| NP/Colorant | C | M | Y | K |
|---|---|---|---|---|
| ... | | | | |
| CM | M | C | N/A | N/A |
| YYK | N/A | N/A | YK | YY |
| ... | | | | |

As shown above, if a drop of C is removed from CM, the resulting NP is M. If a drop of M is removed from CM. the resulting NP is C, and so on. The matrix may be arranged such that colorant combinations having a greater amount of a given colorant are positioned above colorant combinations that have a lesser amount of the given colorant. For example, CMM may be positioned above CM in the matrix. The elements of the matrix may be arranged differently in other examples. The matrix may be referred to as a "decay matrix". The decay matrix may be used to influence a decay sequence of NPs used in color calibrating the printing system 100, as will be explained in more detail below.

In some examples, the elements in the matrix store the colorant combination that would result if a predetermined amount of a given colorant is added to a given colorant combination, rather than subtracted from it.

Figure 2:
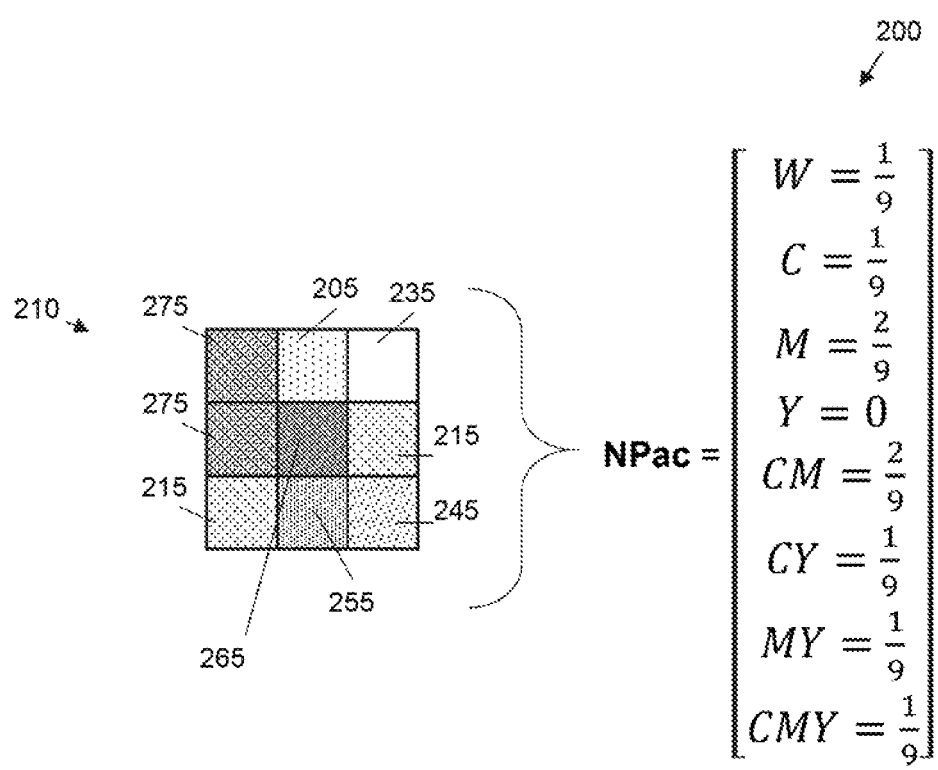
FIG. 2 is a schematic diagram showing a representation of a Neugebauer Primary area coverage vector according to an example.

FIG. 2 shows an example NPac vector 200 for use in a CMY imaging system. The NPac vector 200 may be an adjusted NPac vector resulting from a calibration process performed in accordance with examples described herein. This example shows a three-by-three pixel area 210 of a print output where all pixels have the same NPac vector: vector 200. The NPac vector 200 defines the probability distributions for each NP for each pixel, for example a likelihood that $NP_x$ is to be placed at the pixel location. Hence, in the example print output there is one pixel of White (W) (235); one pixel of Cyan (C) (245); two pixels of Magenta (M) (215); no pixels of Yellow (Y); two pixels of Cyan+Magenta (CM) (275); one pixel of Cyan+Yellow (CY) (255); one pixel of Magenta+Yellow (MY) (205); and one pixel of Cyan+Magenta+Yellow (CMY) (265). Generally, the print output of a given area is generated such that the probability distributions set by the NPac vectors of each pixel are fulfilled. For example, the NPac vector may be effected by a halftone stage that implements the spatial distribution of colorants combinations defined by the vector, e.g. via a series of geometric shapes such as dots of predetermined sizes being arranged at predetermined angles. As such, an NPac vector is representative of the colorant overprint statistics of a given area. Although a CMY system is used for ease of explanation, other imaging systems may be used.

Figure 3:
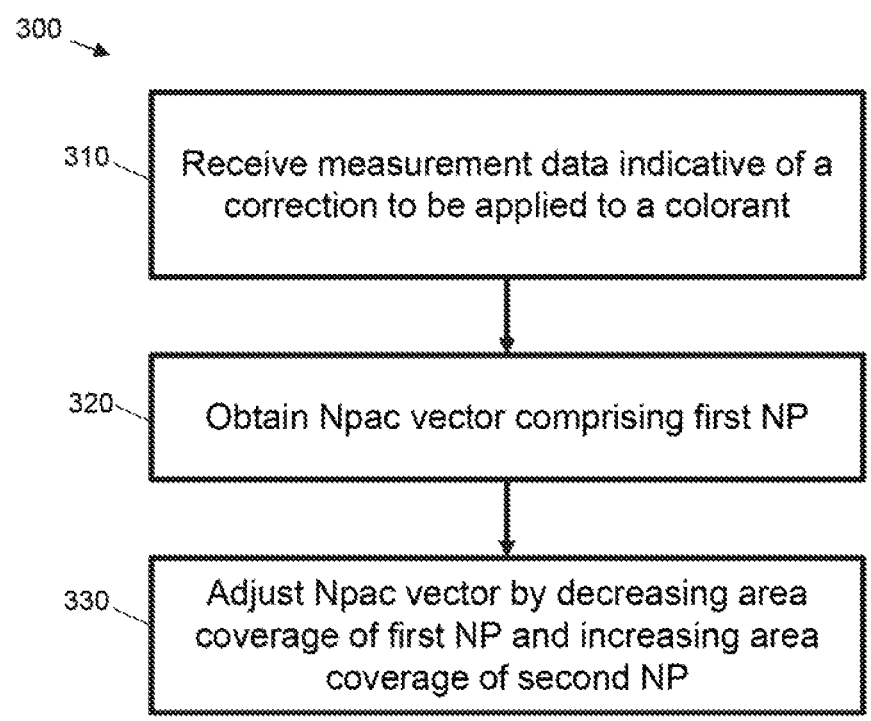
FIG. 3 is a flow chart illustrating a method for calibrating a printing system according to an example.

FIG. 3 shows a method 300 of calibrating a printing system according to an example. In some examples, the method 300 is performed by a print controller such as print controller 140. The print controller may perform the method based on instructions retrieved from a computer-readable storage medium. The printing system may comprise printing system 100.

At item 310, measurement data is received. In some examples, the measurement data is received from a measurement device. The measurement device may be comprised in or separate from the printing system. In some examples, the measurement data is received from a memory. The memory may be comprised in or separate from the printing system. The received measurement data is indicative of an adjustment to be applied to a given colorant in a set of colorants printable by the printing system. The received measurement data may be indicative of an optical property of a printed test patch formed from the given colorant.

At item 320, an NPac vector is obtained. In some examples, the NPac vector is obtained from a HANS lookup table. The NPac vector may be retrieved from a memory of the printing system. The NPac vector comprises an area coverage of a first NP. The NPac vector may also comprise area coverages of one or more other NPs.

At item 330, the NPac vector is adjusted. The NPac vector is adjusted based on the received measurement data. Adjusting the NPac vector results in an adjusted NPac vector. The NPac vector is adjusted by decreasing the area coverage in the NPac vector of the first NP and increasing an area coverage in the NPac vector of a second NP. The first NP and the second NP correspond to colorant combinations that differ by a predetermined amount of the given colorant.

In some examples, the first NP corresponds to a colorant combination comprising a first amount of the given colorant, and the second NP corresponds to a colorant combination comprising a second, different amount of the given colorant. In some examples, one of the first amount and the second amount is zero.

In an example, the predetermined amount comprises a minimum printable amount of the given colorant. For example, the predetermined amount may comprise one drop of the given colorant. In some examples, the predetermined amount comprises more than one drop of the given colorant. In some examples, the predetermined amount comprises a fraction of a drop of the given colorant.

In an example, the colorant combination corresponding to the second NP comprises less of the given colorant than the colorant combination corresponding to the first NP. In another example, the colorant combination corresponding to the second NP comprises more of the given colorant than the colorant combination corresponding to the first NP.

In an example, the colorant combinations corresponding to the first NP and the second NP each comprise a same amount of a further colorant in the set of colorants. In some examples, the colorant combinations corresponding to the first NP and the second NP comprise the same amounts of every colorant except for the given colorant. As such, the colorant combinations corresponding to the first NP and the second NP may be the same except for the predetermined amount of the given colorant.

In an example, an initial area coverage in the NPac vector of the second NP is zero. As such, the second NP may be introduced to the NPac vector as part of the adjusting process. In other words, an NP having an initial area coverage in the NPac vector of zero may be given a non-zero area coverage in the adjusted NPac vector.

In some examples, adjusting the NPac vector comprises decreasing the area coverage in the NPac vector of the first NP and increasing the area coverage in the NPac vector of the second NP by a same amount. As such, adjusting the NPac vector may comprise distributing the initial area coverage in the NPac vector of the first NP between the first NP and the second NP.

In one example, an initial un-adjusted NPac vector may comprise NPs having the following area coverages: W:0.2, CM:0.4, CMM:0.4. As the NPac vector comprises a convex combination of NPs, the area coverages of the NPs in the NPac vector sum to 1. In this example, the colorant reduction target for magenta (M) is −25%. The colorant reduction target is obtained via the received measurement data, for example in the form of a correction factor derived based on a measured optical property of a printed patch formed of the M colorant. The number of drops of the M colorant in the initial NPac vector is 0.4*1 (CM)+0.4*2 (CMM)=1.2. The drop reduction target is therefore 1.2*0.25=0.3. In this example, the first NP is CMM, since it comprises the greatest number of drops of M of the NPs present in the initial NPac vector. In order to meet the drop reduction target of 0.3, 0.3 of the area coverage of CMM is transferred to an NP having one drop less of M, namely CM. CM is the second NP in this case. Since CM is already present in the NPac vector, the transferred area coverage is added to the initial area coverage of CM. As such, the area coverage of CMM is decreased and the area coverage of CM is increased. The resulting NPac vector has the following area coverages: W:0.2, CM:0.7, CMM:0.1. The number of drops of the M colorant in the adjusted NPac vector is 0.7*1 (CM)+0.1*2 (CMM)=0.9 (25% less than the initial number of drops of M, namely 1.2). Therefore the colorant reduction target is met.

In some examples, the second NP is selected from a matrix of NPs. The matrix of NPs includes the first NP and the second NP. Selecting the second NP from the matrix may be based on a position in the matrix of the first NP.

In some examples, adjusting the NPac vector comprises decreasing an area coverage in the NPac vector of a first further NP and increasing an area coverage in the NPac vector of a second further NP. The first further NP and the second further NP correspond to colorant combinations that differ by a predetermined amount of the given colorant. The predetermined amount may be the same as or different from the predetermined amount corresponding to the difference between the first NP and the second NP. For example, the predetermined amount may comprise a drop of the given colorant. The colorant combination corresponding to the first NP and the colorant combination corresponding to the first further NP each comprise a same amount of the given colorant. For example, where the given colorant is M, the first NP and first further NP may comprise CMM and YMM respectively. As such, the first NP and the first further NP may be grouped together based on the two NPs having the same amount of the given colorant. Similarly, the colorant combination corresponding to the second NP and the colorant combination corresponding to the second further NP may each comprise a same amount of the given colorant. For example, where the given colorant is M, the second NP and second further NP may comprise CM and YM respectively.

The area coverage in the NPac vector of the first further NP may be decreased by a same amount as the area coverage in the NPac vector of the second further NP is increased. As such, adjusting the NPac vector may comprise distributing the initial area coverage in the NPac vector of the first NP between the first NP and the second NP (for example between CMM and CM), and distributing the initial area coverage in the NPac vector of the first further NP between the first further NP and the second further NP (for example between YMM and YM).

In some examples, adjusting the NPac vector comprises decreasing the area coverage of the first NP using a first weighting and decreasing the area coverage of the first further NP using a second weighting. The first and second weightings may be based on an area coverage reduction to be applied to a group of NPs comprising the first NP and the first further NP. The first and second weightings may be based on an initial area coverage in the NPac vector of the first NP and the first further NP respectively. As such, existing color relationships may be maintained during the calibration process.

In some examples, an amount of the given colorant in the adjusted NPac vector is determined. The amount of the given colorant in the adjusted NPac vector may be compared with the adjustment indicated by the received measurement data. In response to determining that the amount of the given colorant in the adjusted NPac vector has a predetermined relationship with the adjustment indicated by the received measurement data, the NPac vector may be further adjusted. In an example, the predetermined relationship comprises the amount of the given colorant in the adjusted NPac vector not being equal to a target amount. The target amount may derived based on the adjustment indicated by the received measurement data. In some examples, the predetermined relationship comprises the amount of the given colorant in the adjusted NPac vector being greater than the target amount.

Further adjusting the adjusted NPac vector comprises decreasing the area coverage in the adjusted NPac vector of the second NP and increasing the area coverage in the adjusted NPac vector of a third NP. The second NP and the third NP correspond to colorant combinations that differ by a further predetermined amount of the given colorant. The further predetermined amount may be the same as or different from the predetermined amount corresponding to the difference between the first NP and the second NP. For example, the further predetermined amount may comprise one drop of the given colorant. In some examples, the colorant combination corresponding to the first NP comprises a first amount of the given colorant, the colorant combination corresponding to the second NP comprises a second amount of the given colorant, and the colorant combination corresponding to the third NP comprises a third amount of the given colorant. For example, the colorant combinations corresponding to the first, second and third NPs may comprise three drops, two drops and one drop of the given colorant, respectively. In one example, where the given colorant is M, the colorant combinations corresponding to the first, second and third NPs are CMM, CM and C, respectively.

The method 300 may be repeated for other colorants in the set of colorants, and/or for other NPac vectors.

The adjusted NPac vector may be stored in a lookup table mapping colorimetric values with NPac vectors, e.g. a HANS lookup table. The color mapping represented by the HANS lookup table may be applied to print job data, for example in a printing operation performed by the printing system.

Figure 4:
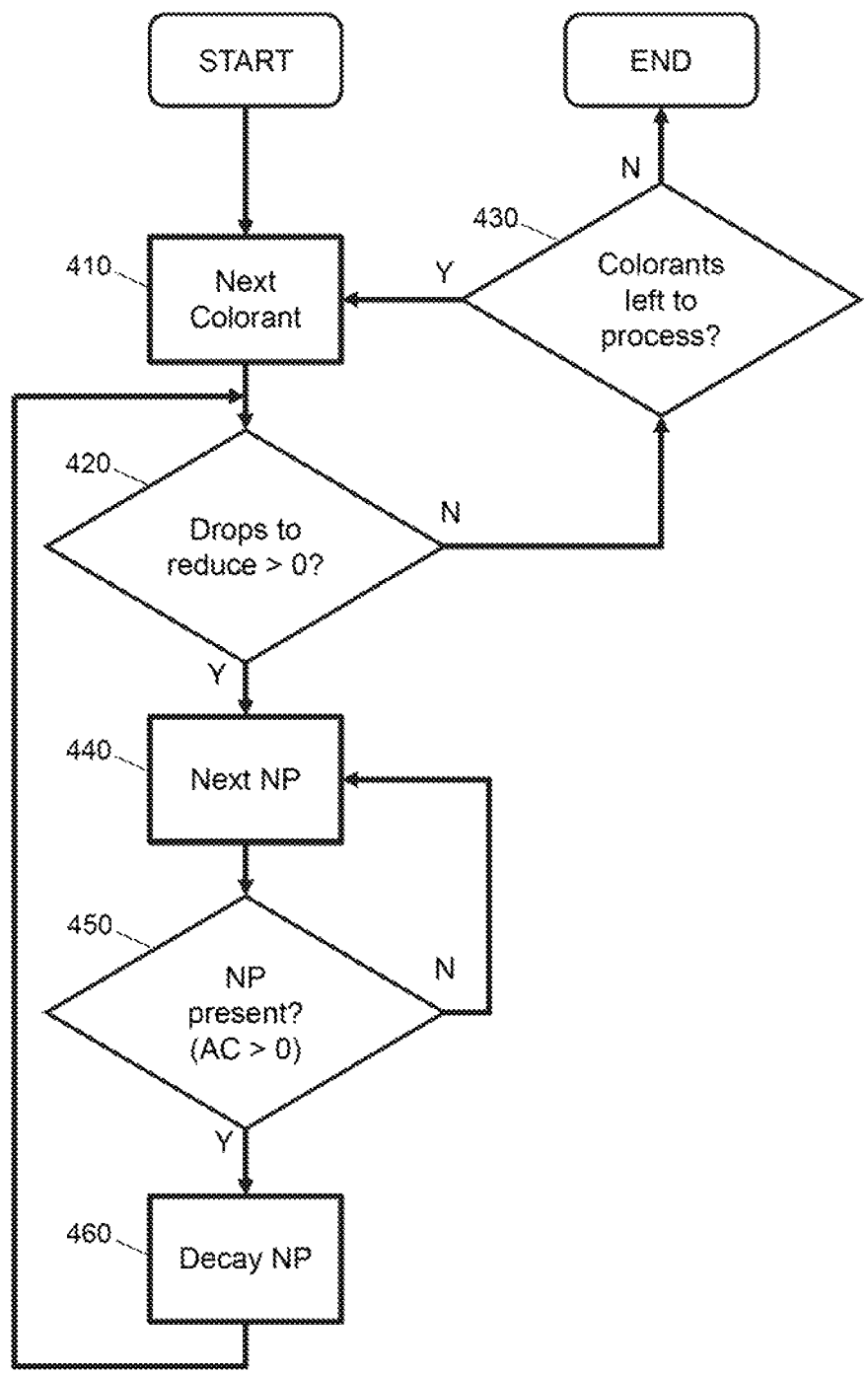
FIG. 4 is a flow chart illustrating a method for calibrating a printing system according to an example.

FIG. 4 shows a method 400 of calibrating a printing system according to an example. In some examples, the method 400 is performed by a print controller such as print controller 140. The print controller may perform the method based on instructions retrieved from a computer-readable storage medium. The printing system may comprise printing system 100. The method 400 is performed for a given NPac vector. In some examples, the method 400 is performed for a plurality of NPac vectors in a HANS lookup table useable by the printing system. In some examples, the method 400 is performed for every NPac vector in a HANS lookup table useable by the printing system.

The method 400 may be considered to represent a nested loop through a decay matrix of NPs, which traverses different NPs for each colorant in the printing system.

At item 410, a given colorant is selected from a set of colorants in the printing system.

At item 420, it is determined whether the amount of the given colorant in the NPac vector is to be reduced. Such a determination may be based on received data indicating an adjustment or correction to be applied to the given colorant, and on an initial amount of the given colorant in the NPac vector.

If it is determined at item 420 that the amount of the given colorant in the NPac vector is not to be reduced, it is determined at item 430 whether there are any colorants left to process for the NPac vector. If there are colorants left to process for the NPac vector, the next colorant is selected at item 410, and the process is repeated.

If it is determined at item 420 that the amount of the given colorant in the NPac vector is to be reduced, an NP is selected at item 440 from a set of available NPs. The set of available NPs comprises the NPs that may be formed from combinations of the colorants in the printing system. The set of available NPs may be arranged in a decay matrix. The decay matrix may define a predetermined order of the available NPs. The selected NP may comprise an NP that has the highest possible number of drops of the given colorant. As such, the method may start at the top of the decay matrix.

At item 450, it is determined whether the selected NP is present in the NPac vector that is to be adjusted. The selected NP is present in the NPac vector if the selected NP has a non-zero area coverage in the NPac vector. If it is determined that the selected NP is not present in the NPac vector, another NP is selected at item 440, and the process is repeated. The other NP may comprise fewer drops of the given colorant compared to the initially selected NP.

If it is determined at item 450 that the selected NP is present in the NPac vector, the selected NP is decayed at item 460 in order to reduce the amount of the given colorant. The decay process involves splitting the area coverage of the selected NP between the selected NP and a decayed NP. The decayed NP differs from the selected NP by a predetermined amount of the given colorant, e.g. a drop of the given colorant.

If the initial area coverage in the NPac vector of the selected NP is greater than the reduction target for the given colorant, the area coverage that is to be transferred from the selected NP to the decayed NP in order to satisfy the colorant reduction target is determined. Transferring the determined area coverage from the selected NP to the decayed NP satisfies the colorant reduction target, therefore completing the calibration process for the given colorant.

If the initial area coverage in the NPac vector of the selected NP is less than the reduction target for the given colorant, the entire area coverage in the NPac vector of the selected NP is transferred to the decayed NP. The transferred area coverage is subtracted from the colorant reduction target to determine an amount of the given colorant that is still to be reduced. The process is then repeated, e.g. splitting the area coverage of the decayed NP between the decayed NP and a further decayed NP, and so on, until the colorant reduction target is met.

The above process may be repeated for different colorants in the set of colorants, and/or repeated for different NPac vectors in a HANS look-up table of the printing system.

In the example shown in FIG. 4, colorants are adjusted by reducing a number of drops of the colorants that are output by the printing system. In other examples, colorants are adjusted by increasing a number of drops of the colorants that are output.

In some examples, the initial NPac vectors in the HANS lookup table comprise a greater amount of colorant than that in a nominal state of the printing system. This may be referred to as a "high colorant lookup table". The uncalibrated state of the printing system may have a built-in reduction that brings the colorant amounts to nominal levels. When calibration is performed, colorant may be reduced from the high colorant lookup table. Therefore, by reducing the colorant amount by less than the built-in reduction, colorant may be increased in relation to the uncalibrated state. Colorant quantities and/or drop sizes may include inherent variation. For example, an amount of a given colorant may have a +/−20% variation relative to a nominal value. Therefore, a range of +/−20% of the amount of colorant may be used during calibration. In this case, the high colorant lookup table is configured for 20% more colorant than the actual colorant limit of the printing system. Therefore, at the nominal state of the printing system, there may be a nominal calibration in place for the colorant amount to be at the actual default colorant limit. Then, if the colorant amount is to be decreased, calibration is performed with factors less than 1, and if the colorant amount is to be increased, calibration is performed with factors greater than 1 (up to the boundary of +20% in this example).

Figure 5:
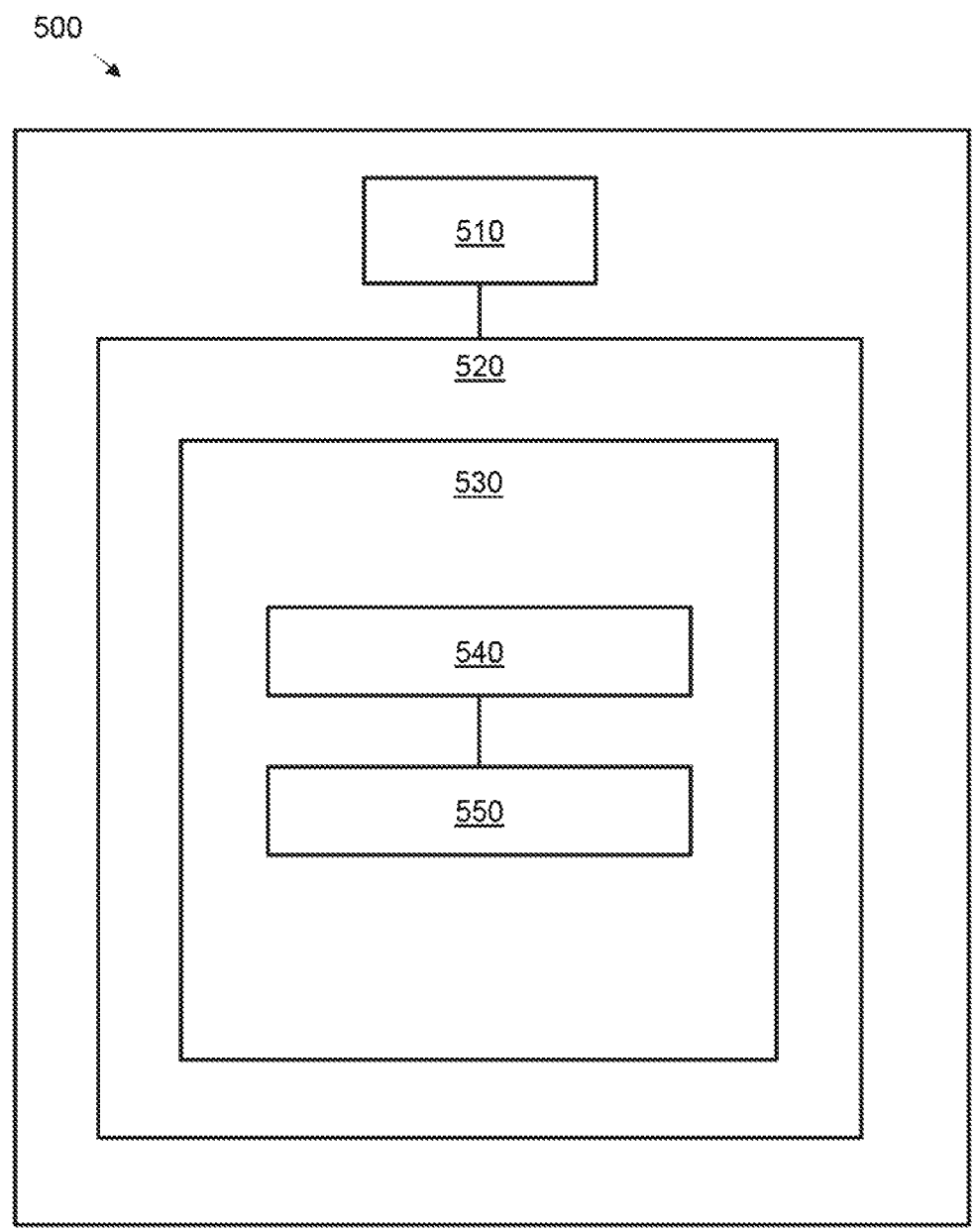
FIG. 5 is a schematic diagram of a processor and a computer readable storage medium with instructions stored thereon according to an example.

FIG. 5 shows example components of a printing system 500, which may be arranged to implement certain examples described herein. A processor 510 of the printing system 500 is connectably coupled to a computer-readable storage medium 520 comprising a set of computer-readable instructions 530 stored thereon, which may be executed by the processor 510. The printing system 500 may comprise a printing system similar to printing system 100.

Instruction 540 instructs the processor 510 to receive measured optical data. The measured optical data may be received, for example, from an optical measuring device comprised in or communicatively coupled to the printing system 500. The measured optical data indicates a measured optical property of a printed test area. The printed test area is formed from a given printing fluid in a set of printing fluids useable by the printing system 500.

Instruction 550 instructs the processor 510 to calibrate the printing system 500 by modifying, based on the optical property of the printed test area, an NPac vector. Modifying the NPac vector comprises decreasing an area coverage in the NPac vector of a first NP. Modifying the NPac vector further comprises increasing an area coverage in the NPac vector of a second NP. The first NP and the second NP each comprise a contribution of a printing fluid in the set of printing fluids. In some examples, the first NP and the second NP each comprise contributions from multiple printing fluids in the set of printing fluids. The first NP and the second NP comprise different contributions of the given printing fluid, namely the printing fluid relating to the measured optical data. The modified NPac may be used in a printing operation involving the printing system 500.

Processor 510 can include a microprocessor, microcontroller, processor module or subsystem, programmable integrated circuit, programmable gate array, or another control or computing device. The computer-readable storage medium 520 can be implemented as one or multiple computer-readable storage media. The computer-readable storage medium 520 includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 530 can be stored on one computer-readable storage medium, or alternatively, can be stored on multiple computer-readable storage media. The computer-readable storage medium 520 or media can be located either in the printing system 500 or located at a remote site from which computer-readable instructions can be downloaded over a network for execution by the processor 510.

Certain examples described herein enable a reduction in the number of test patches to be printed and measured for a given printer calibration. Test patches are printed and measured for individual colorants rather than for NPs or colorant combinations. The number of colorants in a printing system may be less than the number of colorant combinations useable by the printing system. A relatively small number of test patches may therefore be printed and measured compared to a case in which NPs or colorant combinations are individually printed, measured and adjusted. By reducing the number of test patches to be printed and measured, the calibration process may be made more efficient. For example, the time to calibrate a given printer may be reduced. Additionally or alternatively, by reducing the number of test patches to be printed and measured, fewer resources may be used, such as printing fluid or substrate, thereby reducing wastage and/or cost.

Certain examples described herein enable a colorant correction to be evenly distributed across different but related NPs in an NPac vector. Distributing the correction across NPs enables relationships between colors to be maintained during the calibration process and reduces deviation from the initial NPac structure. This results in an increased visual quality of the calibrated output compared to a case in which a correction is not distributed across related NPs.

Certain examples described herein enable an amount of printing fluid in an NPac vector to be reduced without increasing an amount of whitespace. Such a printing fluid reduction may be distributed amongst related NPs by "decaying" NPs in the NPac vector. This is in contrast to increasing a contribution of whitespace to the NPac vector to compensate for a reduced contribution of a given NP. By reducing a contribution of whitespace to the NPac vector, graininess in the printed output may be reduced, thereby increasing a visual quality of the printed output.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of calibrating a printing system, the method comprising:
    receiving measurement data indicative of an adjustment to be applied to a given colorant in a set of colorants printable by the printing system;
    obtaining a Neugebauer Primary area coverage (NPac) vector comprising an area coverage of a first Neugebauer Primary (NP); and
    based on the received measurement data, adjusting the NPac vector by decreasing the area coverage in the NPac vector of the first NP and increasing an area coverage in the NPac vector of a second NP,
    wherein the first NP and the second NP correspond to colorant combinations that differ by a predetermined amount of the given colorant.

2. The method of claim 1, wherein the colorant combinations corresponding to the first NP and the second NP each comprise a same amount of a further colorant in the set of colorants.

3. The method of claim 1, wherein the predetermined amount comprises a minimum printable unit of the given colorant.

4. The method of claim 1, wherein the colorant combination corresponding to the second NP comprises less of the given colorant than the colorant combination corresponding to the first NP.

5. The method of claim 1, wherein the adjusting the NPac vector comprises decreasing the area coverage in the NPac vector of the first NP and increasing the area coverage in the NPac vector of the second NP by a same amount.

6. The method of claim 1, comprising selecting the second NP from a matrix of NPs including the first NP and the second NP, the selecting being based on a position in the matrix of the first NP.

7. The method of claim 1, comprising, in response to determining that an amount of the given colorant in the adjusted NPac vector has a predetermined relationship with the adjustment indicated by the received measurement data, further adjusting the adjusted NPac vector by decreasing the area coverage in the adjusted NPac vector of the second NP and increasing an area coverage in the adjusted NPac vector of a third NP, wherein the second NP and the third NP correspond to colorant combinations that differ by a further predetermined amount of the given colorant.

8. The method of claim 1, wherein an initial area coverage in the NPac vector of the second NP is zero.

9. The method of claim 1, wherein the adjusting the NPac vector comprises decreasing an area coverage in the NPac vector of a first further NP and increasing an area coverage in the NPac vector of a second further NP, wherein the first further NP and the second further NP correspond to colorant combinations that differ by a predetermined amount of the given colorant, and wherein the colorant combination corresponding to the first NP and the colorant combination corresponding to the first further NP each comprise a same amount of the given colorant.

10. The method of claim 9, comprising decreasing the area coverage of the first NP using a first weighting and decreasing the area coverage of the first further NP using a second weighting, the first and the second weightings being based on an initial area coverage in the NPac vector of the first NP and the first further NP respectively.

11. The method of claim 1, comprising using the adjusted NPac vector in a printing operation.

12. A printing system comprising:
a printing device to print a calibration area onto a print substrate, the calibration area corresponding to a given colorant in a set of colorants printable by the printing system;
a measurement interface to receive an indication of a measured optical property of the printed calibration area;
a memory comprising a vector in an area coverage space, the vector defining a statistical distribution of colorant combinations including a first colorant combination over an area of a halftone; and
a print controller to modify the vector on the basis of the measured optical property by decreasing a contribution to the vector of the first colorant combination and increasing a contribution to the vector of a second colorant combination, the second colorant combination differing from the first colorant combination by a predetermined amount of the given colorant.

13. The printing system of claim 12, wherein the memory comprises a matrix of colorant combinations including the first colorant combination and the second colorant combination, the matrix being populated according to a predetermined format such that the second colorant combination may be identified on the basis of the position in the matrix of the first colorant combination.

14. The printing system of claim 13, wherein different rows of the matrix comprise colorant combinations having different amounts of the given colorant.

15. A non-transitory computer-readable storage medium comprising a set of computer-readable instructions that, when executed by a processor of a printing system, cause the processor to:
receive measured optical data indicating a measured optical property of a printed test area formed from a given printing fluid in a set of printing fluids useable by the printing system; and
calibrate the printing system by modifying, based on the optical property of the printed test area, a Neugebauer Primary area coverage (NPac) vector,
wherein the modifying the NPac vector comprises:
decreasing an area coverage in the NPac vector of a first Neugebauer Primary (NP); and
increasing an area coverage in the NPac vector of a second NP,
wherein the first NP and the second NP each comprise a contribution of a printing fluid in the set of printing fluids, and
wherein the first NP and the second NP comprise different contributions of the given printing fluid.

* * * * *